United States Patent
Zhang et al.

(10) Patent No.: US 11,619,580 B2
(45) Date of Patent: Apr. 4, 2023

(54) RESONATOR-BASED ION-SELECTIVE SENSOR

(71) Applicants: THE UNIVERSITY OF CHICAGO, Chicago, IL (US); UCHICAGO ARGONNE, LLC, Chicago, IL (US)

(72) Inventors: Xufeng Zhang, Westmont, IL (US); Supratik Guha, Chicago, IL (US); Tijana Rajh, Naperville, IL (US)

(73) Assignees: The University of Chicago, Chicago, IL (US); UChicago Argonne, LLC, Chicago, IL (US)

( * ) Notice: Subject to any disclaimer, the term of this patent is extended or adjusted under 35 U.S.C. 154(b) by 22 days.

(21) Appl. No.: 17/262,195

(22) PCT Filed: Jul. 23, 2019

(86) PCT No.: PCT/US2019/043010
§ 371 (c)(1),
(2) Date: Jan. 21, 2021

(87) PCT Pub. No.: WO2020/023496
PCT Pub. Date: Jan. 30, 2020

(65) Prior Publication Data
US 2021/0310944 A1 Oct. 7, 2021

Related U.S. Application Data

(60) Provisional application No. 62/702,019, filed on Jul. 23, 2018.

(51) Int. Cl.
*G01N 21/41* (2006.01)
(52) U.S. Cl.
CPC ... *G01N 21/41* (2013.01); *G01N 2201/06113* (2013.01)

(58) Field of Classification Search
CPC ........... G01N 21/41; G01N 21/7746; G01N 2201/06113; G02B 2006/12138; G02B 6/12007
(Continued)

(56) References Cited

U.S. PATENT DOCUMENTS 6,493,090 B1 * 12/2002 Lading ............... G01N 21/45
356/480
7,483,144 B2 * 1/2009 Sanders ............ G01N 21/39
385/12
(Continued)

FOREIGN PATENT DOCUMENTS

JP H0663967 B2 * 8/1994 ......... G01N 21/7746
WO 2018/067113 4/2018

OTHER PUBLICATIONS

International Searching Authority, International Search Report and Written Opinion dated Oct. 17, 2019, issued in connection with International Patent Application No. PCT/US2019/043010 filed on Jul. 23, 2019, 11 pages.

*Primary Examiner* — Sunghee Y Gray
(74) *Attorney, Agent, or Firm* — McDonnell Boehnen Hulbert & Berghoff LLP

(57) ABSTRACT

The present disclosure relates to systems and methods suitable to measure trace amounts of specific ions in fluid samples. An example system includes a resonator having an input coupler and an output coupler. The example system also includes an ion-selective membrane (ISM) optically coupled to at least a portion of the resonator. The system additionally includes a light source configured to illuminate the resonator by way of the input coupler. Furthermore, the system includes a detector configured to receive output light by way of the output coupler and provide information indicative a concentration of a specific ion proximate to tire ISM.

20 Claims, 20 Drawing Sheets

(58) Field of Classification Search
USPC .......................................................... 356/128
See application file for complete search history.

(56) References Cited

U.S. PATENT DOCUMENTS

| | | |
|---|---|---|
| 2006/0060471 A1 | 3/2006 | Murphy et al. |
| 2013/0261010 A1 | 10/2013 | Bailey et al. |
| 2013/0295688 A1 | 11/2013 | Bailey et al. |
| 2014/0047585 A1 | 2/2014 | Hofrichter et al. |
| 2015/0141267 A1 | 5/2015 | Rothberg et al. |
| 2016/0167861 A1 | 6/2016 | Choi et al. |
| 2017/0045689 A1 | 2/2017 | Zhang et al. |
| 2018/0143145 A1 | 5/2018 | Klein et al. |
| 2019/0226335 A1* | 7/2019 | Lan .......................... G01V 8/12 |

* cited by examiner

RESONATOR-BASED ION-SELECTIVE SENSOR

CROSS-REFERENCE TO RELATED APPLICATION

The present application is a national stage entry of PCT/US2019/043010 filed on Jul. 23, 2019, which claims priority to U.S. patent application Ser. No. 62/702,019, filed on Jul. 23, 2018, the contents of both of which are incorporated herein by reference in their entirety.

GOVERNMENT LICENSE RIGHTS

This invention was partially conceived under Contract No. DE-AC02-06CH11357 between the U.S. Department of Energy and UChicago Argonne, LLC, representing Argonne National Laboratory. The government has certain rights in the invention.

BACKGROUND

Unless otherwise indicated herein, the materials described in this section are not prior art to the claims in this application and are not admitted to be prior art by inclusion in this section.

Trace-level ion sensing is important for a broad range of applications such as biomedical research, environmental protection, industrial and agricultural production, and homeland security. For example, detection of nitrate ions is desirable in agriculture because nitrogen is an important mineral nutrient for most plants. Furthermore, nitrate-based compounds are a contributor to water pollution, such as the dead zone in Gulf of Mexico. However, trace-level detection of nitrate ions at is challenging because nitrate ions are inert and do not interact with most reagents. Additionally, desired sensitivity and selectivity of trace-level ion sensing limit viable conventional technologies to expensive laboratory equipment and procedures. Conventional technologies include spectroscopic detection, electrochemical sensing, among other technologies, which rely on either a complicated assay protocol or sophisticated high-end equipment. As a consequence, the turn-around time and coverage area of such sensing systems are usually limited.

In practical applications, in situ sensing over a large area is often desired, which therefore requires lower cost sensors with good sensitivity and selectivity. Ion-selective field effect transistor (ISFET) sensors are sometimes used for such needs. An ISFET includes a field effect transistor (FET) with a gate functionalized by ion-selective membranes (ISMs). The selectivity of the ISM controls the ion exchange process, which occurs for the target ion when the ISFET is placed in an aqueous solution containing the target ion. The ion-exchange process results in an electric potential at the gate which controls the electric signal amplitude passing through the ISFET. The CMOS-based ISFET also makes it an inexpensive solution. However, such devices have strict requirements on the reference electrode, and also need frequent calibrations, which greatly limit the broad application ISFETs in this area.

SUMMARY

The present disclosure generally relates to sensors that include a resonator and ion-selective membrane.

In a first aspect, a system is provided. The system includes a resonator, an input coupler and an output coupler. The system also includes an ion-selective membrane (ISM) optically coupled to at least a portion of the resonator. The system additionally includes a light source configured to illuminate the resonator by way of the input coupler. The system further includes a detector configured to receive output light by way of the output coupler and provide information indicative a concentration of a specific ion proximate to the ISM.

In a second aspect, an analyte sensor array is provided. The analyte sensor array includes a substrate and a plurality of resonators, a plurality of input couplers, and a plurality of output couplers disposed on the substrate. Each resonator is coupled to a respective input coupler and a respective output coupler. The analyte sensor array also includes a plurality of an ion-selective membranes (ISMs). Each ISM is optically coupled to respective resonators of the plurality of resonators. Furthermore, the analyte sensor array includes at least one light source configured to illuminate the plurality of resonators by way of the respective input couplers. The system includes a detector configured to receive output light by way of the respective output couplers and provide information indicative of a concentration of one or more specific ions proximate to the respective ISMs.

In a third aspect, a method is provided. The method includes introducing a fluidic sample proximate to an ion-selective membrane (ISM). The method also includes that the ISM is optically coupled to at least a portion of a resonator coupled to an input coupler and an output coupler. The method additionally includes causing a light source to emit light so as to illuminate the resonator by way of the input coupler. The method also includes receiving, with a detector, output light by way of the output coupler. The method yet further includes determining, based on the received output light, a resonance characteristic of the resonator. The method also includes determining, based on the refractive index of the resonator, a concentration of a specific ion proximate to the ISM.

In a fourth aspect, a sensor for sensing ion concentration is provided. The sensor includes a resonator and an input coupler coupled to the resonator and configured to receive input light from a light source. The sensor also includes an output coupler coupled to the resonator and configured to transmit output light from the resonator to a detector. The sensor also includes an ion-selective membrane (ISM) optically coupled to at least a portion of the resonator, a refractive index of the ISM being indicative of the ion concentration of a specific ion proximate to the ISM, a resonance condition of the resonator being based on the refractive index of the ISM, the output light being thereby indicative of the ion concentration of the specific ion proximate to the ISM.

Other aspects, embodiments, and implementations will become apparent to those of ordinary skill in the art by reading the following detailed description, with reference where appropriate to the accompanying drawings.

DETAILED DESCRIPTION

Figure 1A:
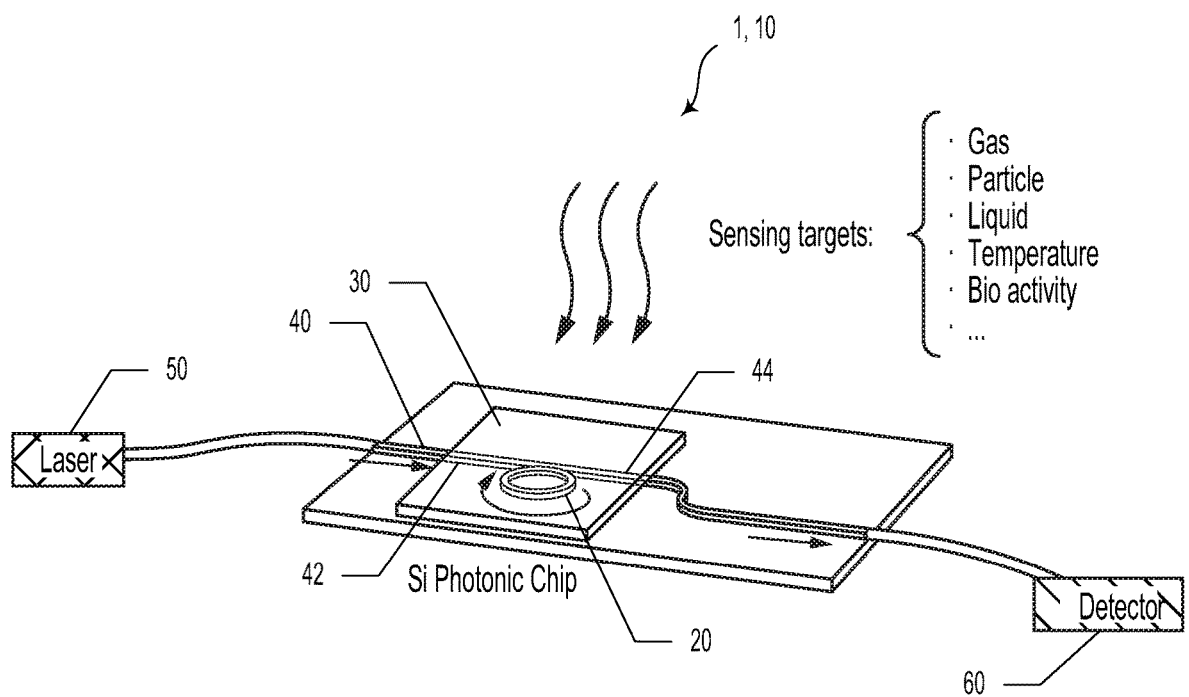
FIG. 1A illustrates a system for sensing an ion concentration including an ion-selective photonic sensor, according to an example embodiment.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

I. Overview

There has been very limited research on the optical properties of ISMs, and even less study on ISM-based optical sensors. With the development of nano-fabrication technologies, devices leveraging nano-photonic behaviors have proven to be a highly effective sensing technology. Particularly, refractometry sensing that detects the refractive index change in the vicinity of the nano-photonic devices has been demonstrated to provide superior sensitivity. When combined with high quality optical microresonators, such refractometry-based sensing technologies exhibit high selectivity and sensitivity, and are less affected by environmental interference.

Optical resonators are devices that have a closed-loop path for light propagation. Such devices are known as microresonators when the dimensions of the device are between approximately 0.1 to 1000 μm. The resonators, including microresonators, can be fabricated using silicon-based, CMOS-compatible processes and are therefore naturally suitable for mass production. Resonance occurs for certain wavelengths, when light propagating along the closed loop path in the resonator undergoes constructive interference. As the resonance condition is highly sensitive to a change in the refractive index in the environment, the optical resonator can be used as a sensor for the environment. Slight changes in the refractive index caused by the chemical environment can lead to significant shift in the resonance wavelength.

When the optical resonator is functionalized with an ion selective membrane (ISM), the optical resonance depends on the ISM refractive index which changes as target ions selectively exchange with the membrane. As a result, the integration of ion-selective membranes with resonant silicon photonics forms an ion-selective refractometry chemical sensor that combines the advantages of both technologies: great selectivity and high sensitivity.

A sensor that combines the advantages of a refractometry sensor—with its high sensitivity—with that of an ion-selective membrane—with its high selectivity—can provide an integrated ion-selective sensor platform that provides static or dynamic trace-level ion sensing.

The present disclosure describes an integrated photonic microresonator-based sensor functionalized using an ISM coating that is specific for nitrate ions. The disclosure describes the design, fabrication, functionalization of such a sensor, and its performance in nitrate ion sensing. Experiments provide unambiguous correlation between the nitrogen concentration and the optical resonance wavelengths. Good ion selectivity is also demonstrated.

The systems and methods described herein could be applied to a wide range of chemical sensing applications including industrial settings, environmental protection, public health, water quality monitoring, and agricultural production, among other possibilities. The developed optical sensing platform provides continuous, in situ chemical sensing with high sensitivity and selectivity. Such characteristics may serve to reduce cost, labor, and turn-around time in many chemical sensing applications. Compared with existing sensing technologies, the systems and methods described herein combine ion selective membranes with high-quality optical resonators. Such systems and methods provide sensing of ions at extremely low concentrations with both high selectivity and sensitivity, and provide improved immunity to electronic noise and fluctuation.

II. Example Systems

FIG. 1A illustrates a system 1 for sensing an ion concentration including an ion-selective photonic sensor 10, according to an example embodiment. In an example embodiment, the sensor 10 is developed based on integrated silicon photonics and includes a high quality factor micro-resonator 20 fabricated using SU-8 on a silica substrate. The micro-resonator 20 is evanescently coupled using an on-chip rib waveguide 40. Transmission measurement with very high spectral resolution is carried out by sending light from a tunable laser 50 through the sensor 10 and monitoring the transmission spectrum of the output light received by the detector 60. The transmission spectrum shows resonance dips at wavelengths that satisfy the resonance condition (as shown in FIG. 2B, for example). As described herein, the micro-resonator 20 is functionalized with a nitrate ISM 30. When placed in an aqueous environment with different nitrate concentrations, the refractive index of the functionalization coating (ISM 30) changes, which in turn shifts the optical resonance wavelength of the micro-resonator 20. Based on the high device quality and spectral resolution of the laser 50, very high sensitivity is achievable. As the sensing target is ions in aqueous environments, a laser that emits light in the visible light regime could be selected because of the low absorption loss of water in this wavelength range.

Figure 1B:
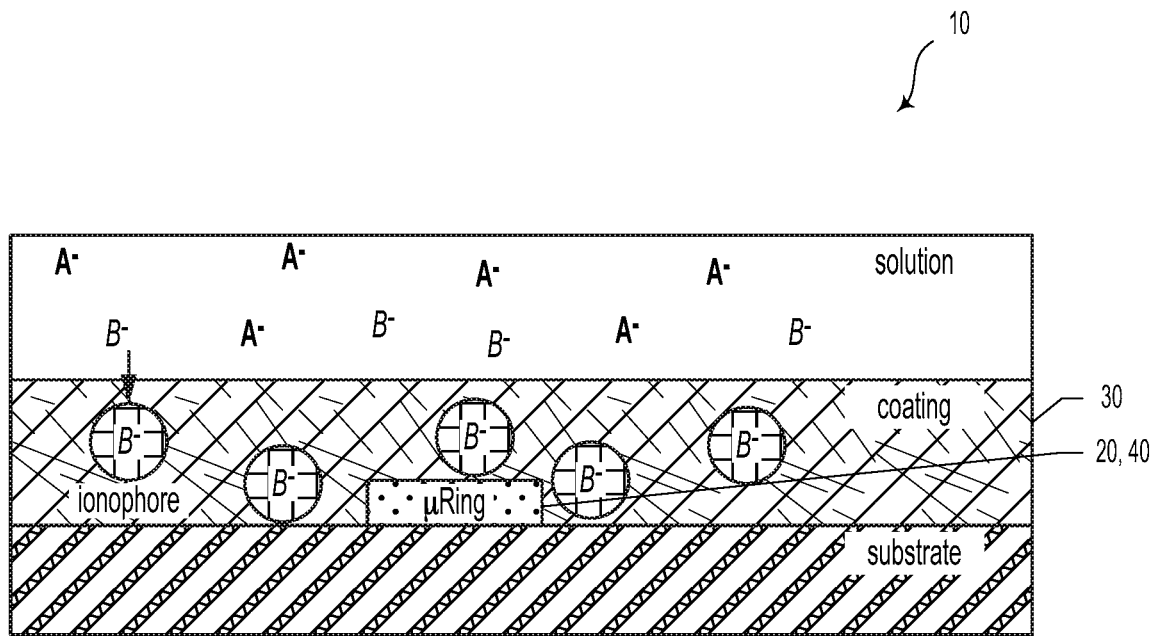
FIG. 1B illustrates a cross-sectional view of the sensor, according to an example embodiment.

FIG. 1B illustrates a cross-sectional view of the sensor 10, according to an example embodiment.

Figure 2A:
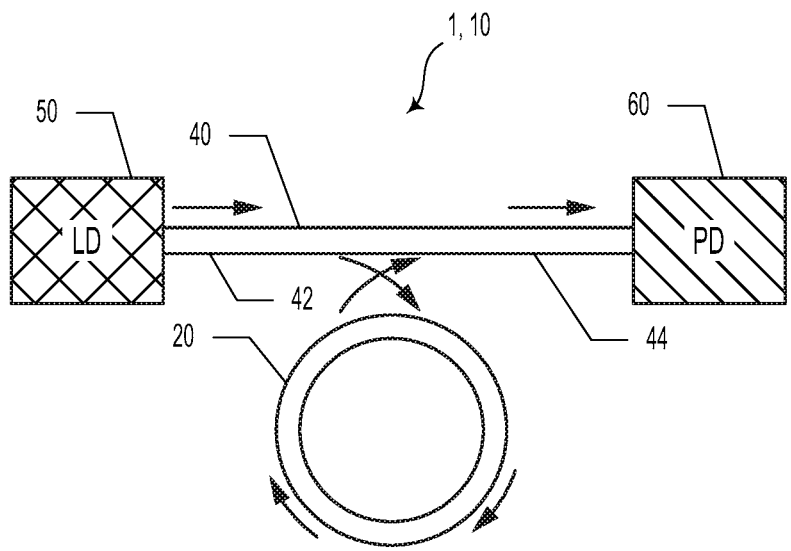
FIG. 2A illustrates a ring resonator, according to an example embodiment.
Figure 2B:
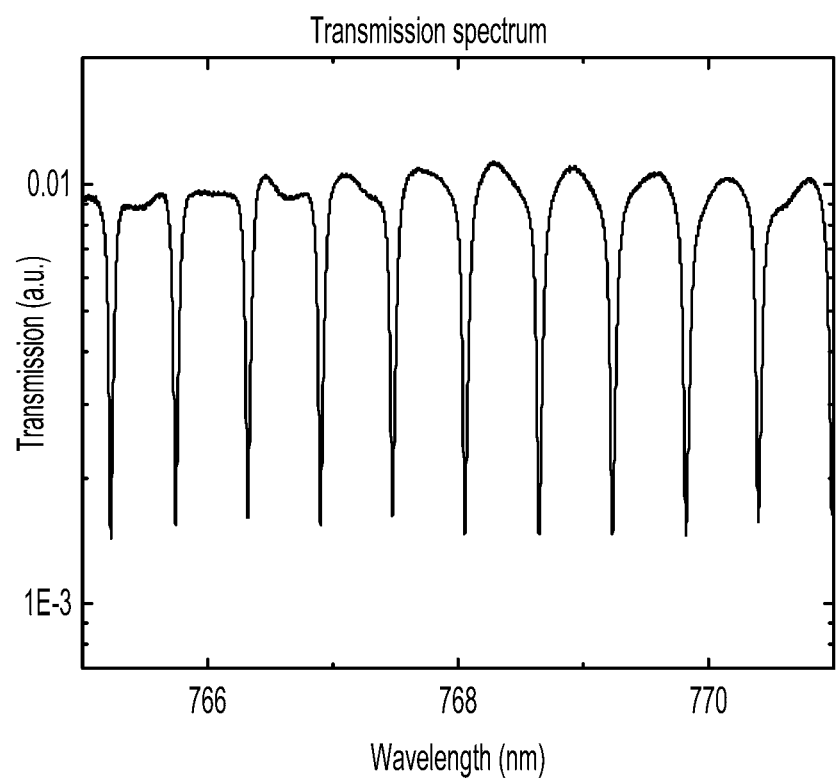
FIG. 2B illustrates a transmission spectrum of a ring resonator, according to an example embodiment.

FIG. 2A schematically illustrates a sensor 10 comprising a resonator 20 in the form of ring resonator and a waveguide 40 for coupling light to the ring resonator 20, according to an example embodiment. While certain embodiments described herein relate to ring resonators, it will be understood that other types of resonators 20 are possible. For example, other types of optical resonators 20 could be utilized in a similar manner as the ring resonators described herein. Without limitation, whispering gallery resonators (e.g., dielectric cylinders, disks, rings, racetracks, toroids, goblets, polygons, microbottles, etc.), Fabry-Perot cavities (e.g., mirror-based cavities and Bragg grating-based cavities), and photonic crystal cavities are all possible alternatives to ring resonators and each is contemplated within the context of the present disclosure.

The portion of the waveguide 40 that couples light from the light source 50 to the resonator 20 is referred to herein as the input coupler 42. The portion of the waveguide 40 that couples light from the resonator 20 to the detector 60 is referred to herein as the output coupler 44. In general, the resonator 20 is coupled to the input coupler 42 to receive input light therefrom and the resonator 20 is coupled to the output coupler 44 to transmit output light thereto. The input coupler 42 and output coupler 44 are formed by the common waveguide 40 in the illustrated embodiment, but it is contemplated that the input and output couplers 42, 44 could be formed as separate structures.

FIG. 2B illustrates a transmission spectrum of a ring resonator 20, according to an example embodiment.

Figure 3:
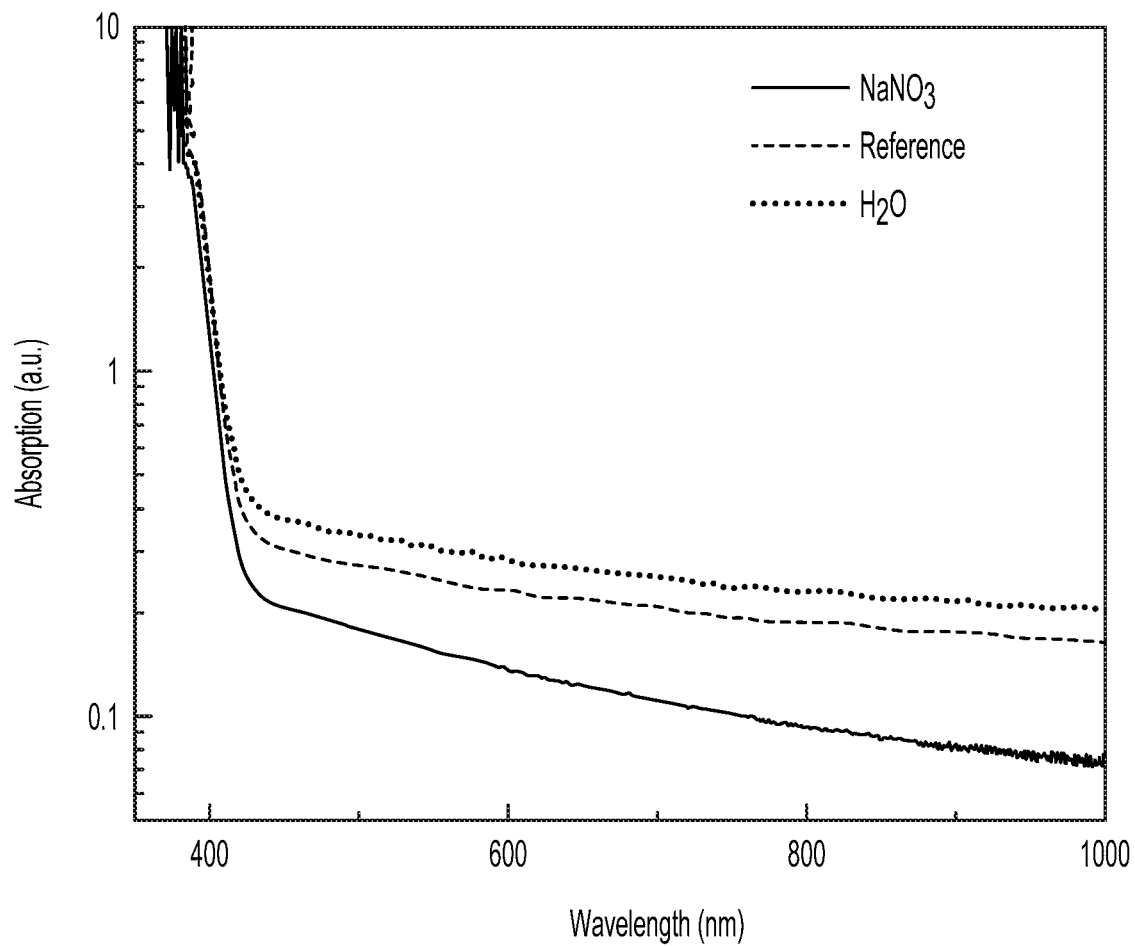
FIG. 3 illustrates a UV-VIS transmission spectrum of a 100-μm-thick nitrate ion-selective membrane with different soaking conditions: no soaking (dashed line), soaked in water (dotted line), and soaked in sodium nitrate solution with 1000 ppm nitrogen concentration (solid line), according to an example embodiment.

FIG. 3 illustrates a UV-VIS transmission spectrum of a 100-μm-thick nitrate ion-selective membrane with different soaking conditions: no soaking (dashed line), soaked in water (dotted line), and soaked in sodium nitrate solution with 1000 ppm nitrogen concentration (solid line), according to an example embodiment.

The functionalization coating used on the resonators 20 described herein was a nitrate ISM 30 composed of tridodecylmethylammonium nitrate (TDDMA-$NO_3^-$) dispersed in polyvinyl chloride (PVC). Such ISMs 30 are conventionally used in ion-selective field effect transistor (ISFET) sensors. When placed in nitrate ion solutions, the ISM 30 exchanges nitrate ions with the environment and the ionophore makes such ion exchange process highly specific to nitrate ions. As a result, an electrical potential is built up between the ISM 30 and the solution, which provides a direct readout of the ion concentration contrast. However, the optical properties of such ISMs have been long ignored. In fact, these ISMs are transparent in the visible light regime, with apparent absorption peaks only below 430 nm as illustrated in FIG. 3. The ion exchange process only slightly affects its absorption properties. When soaked in pure water, the absorption slightly increases, while soaking in high concentration nitrate solution reduces the absorption. Accordingly, the ISMs 30 described herein are good candidates for functionalization coating for integrated photonic sensors. Combined with the high sensitivity of photonic sensing platforms, trace-level detection of ions can be achieved.

While certain described embodiments relate to TDDMA-$NO_3^-$ ISMs 30, it will be understood that other ISMs 30 are possible. For example, there exist other potential ISMs 30 for nitrates such as trioctylmethylammonium nitrate (TOMA-$NO^-$), tritetradecylmethylammonium nitrate (TTDMA-$NO_3^-$), trihexadecylmethylammonium nitrate (THDMA-$NOC_3^-$), and trioctadecylmethylammonium nitrate (TODMA-$NO_3^-$). Furthermore, while nitrate ion sensing is described herein, the present concepts could be extended to sensing other types of ions, such as fluoride, phosphate, etc. Without limitation, the following ISMs could be used for sensing of fluoride ions: gallium (III) Schiff base complexes, uranyl-salophen receptors, bis[di-n-alkyl (fluoro)stannyl] methanes, bis[halodiphenyl stannyl] alkanes, zirconium(IV) porphyrins, and organotin compounds. Additionally or alternatively, the following ISMs 30 could be used for sensing of phosphate ions: derivatives of dibenzyltin dichloride, multidentate-tin(IV), bis(tribenzyl) tin oxide, bis-thiourea, uranyl salophene derivatives, and macrocyclic amide, among other possibilities.

In the illustrated embodiments, the ionophores is dispersed in a polyvinyl chloride (PVC) matrix. It is however contemplated that in some embodiments, the ionophores could be dispersed in a matrix other than PVC.

Figure 4A:
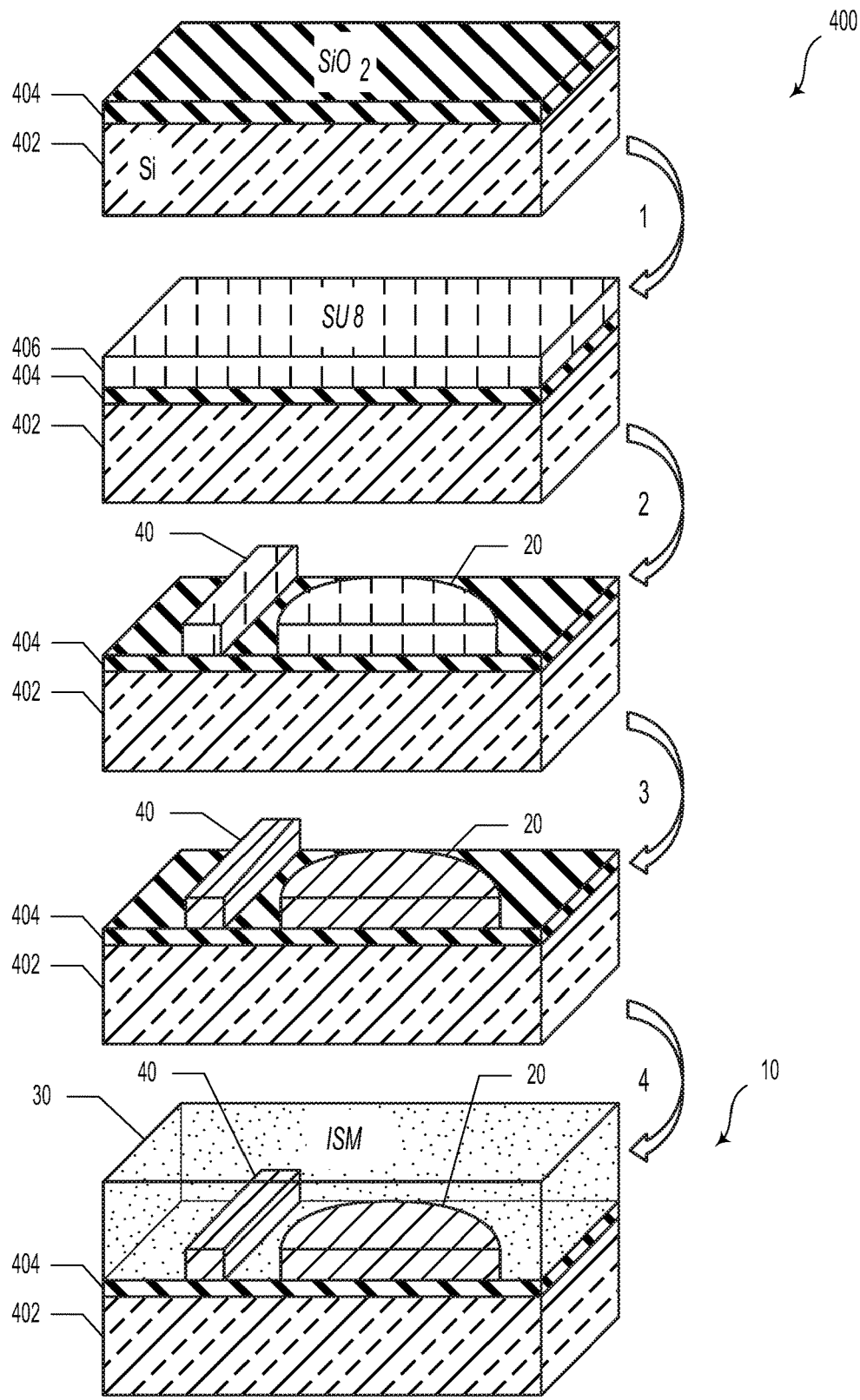
FIG. 4A illustrates a fabrication process of a photonic sensor chip, according to an example embodiment.

FIG. 4A illustrates a fabrication process 400 for a photonic sensor chip (e.g., sensor 10 as illustrated and described in reference to FIGS. 1A, 1B, and 2A), according to an example embodiment. Step 1: spin coating; Step 2: Electron beam lithography: Step 3: Hard baking; Step 4: Functionalization coating.

The device is fabricated using an epoxy based photoresist, such as SU-8. First, a photoresist layer 406 of 1 μm thick SU-8 is spin coated on silicon wafer 402 with a 5 μm thick silica layer 404 which isolates the SU-8 photonic structure from the silicon substrate 402. Then, electron beam lithography is used to define the geometry of the photonic structures (waveguides 40 and ring resonators 20). The photonic structures form after a timed development process, and no etching process is needed. Thereafter, the device is hard baked at an elevated temperature (225° C.) for 10 minutes to fully cross-link the SU-8 epoxy.

As a final step, the device is coated with nitrate ion selective membrane (e.g., ISM 30). A droplet of precursor liquid is placed on the device surface and a thin film applicator is drawn across the device surface to provide a uniform coating layer. Because of the precursor liquid is in tetrahydrofuran (THF) which is a good SU-8 remover, the preceding hard baking process is important as it provides the chemical and mechanical strength for the SU-8 microstructures to survive the coating process. After coating, the device is left to dry in a vented hood overnight and a final coating thickness of around 4 μm is measured. The thick coating additionally isolates and protects the underlying the photonic structure. It will be understood that other final coating thicknesses are possible and contemplated within the scope of the present disclosure.

While some embodiments relate to microstructures formed from SU-8, it will be understood that other materials could be utilized to form the optical resonator 10 and/or waveguide 40. For example, other semiconductor, dielectric, and/or polymeric materials, are possible alternatives and each is contemplated within the context of the present disclosure. Other types of silicon-based waveguide materials (e.g., silicon or silicon nitride, silicon dioxide, silicon carbide, etc.) could be used to form the resonators described herein. The resonator 20 and/or coupling waveguide 40 could also be formed of other non-silicon materials such as GaAs, diamond, titanium dioxide ($TiO_2$), for example. In general, the resonator 20 and/or coupling waveguide 40 could be formed of materials with a high dielectric constant (high-k dielectric materials).

Similarly, the substrate that the resonator and/or waveguide are formed upon could be other than silica on silicon as shown herein. The refractive index of the substrate is smaller than that of the material used to form the resonator 20 and waveguide 40. For example, the substrate could be GaAs. GaN, glass, quartz, and the like.

Figure 4B:
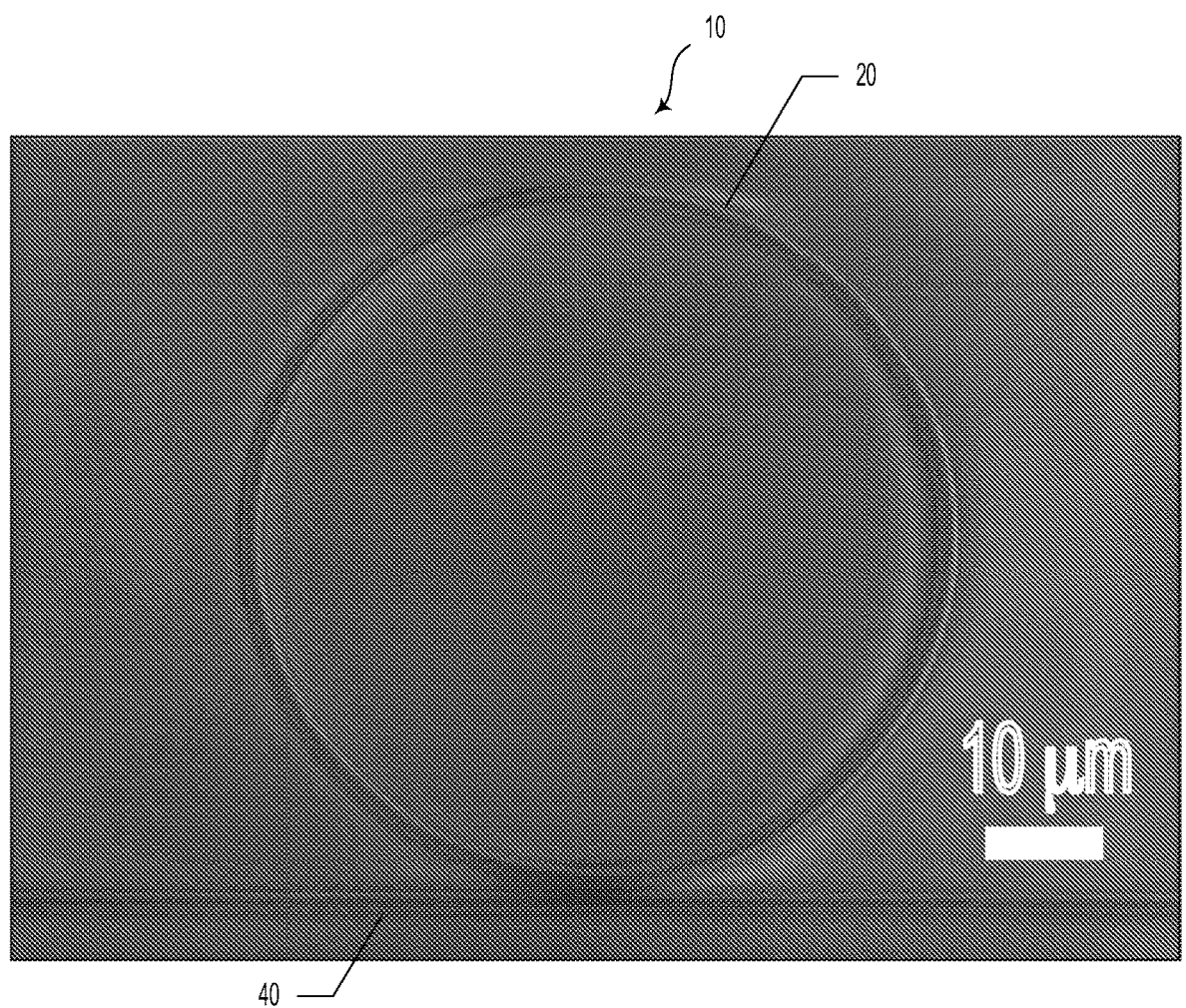
FIG. 4B illustrates a scanning electron microscope (SEM) image of a fabricated microring resonator, according to an example embodiment.

FIG. 4B illustrates a scanning electron microscope (SEM) image of a fabricated microring resonator 20 and waveguide 40, according to an example embodiment fabricated using the method described above. The microring resonator 20 of the illustrated embodiment has a diameter of 60 μm, a thickness of 1 μm, and a coupling gap of 300 nm.

Figure 4C:
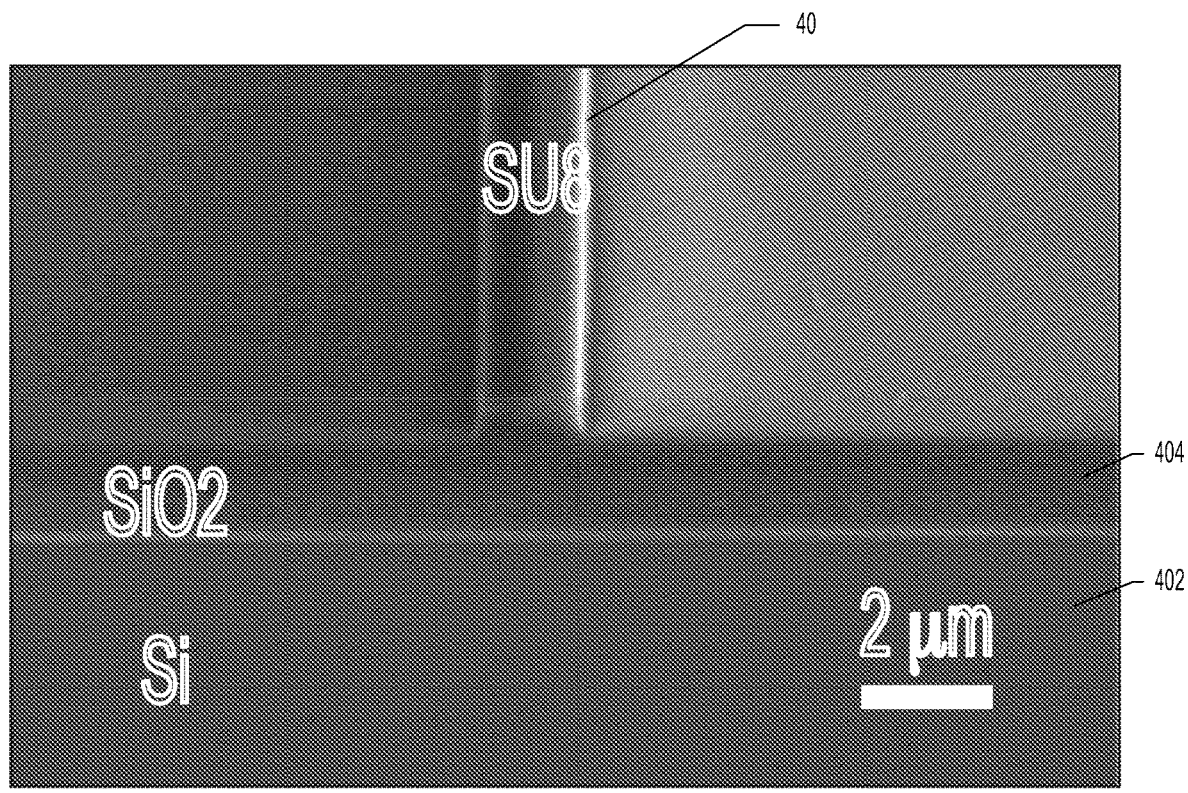
FIG. 4C illustrates a scanning electron microscope (SEM) image of a waveguide cross-section, according to an example embodiment.

FIG. 4C illustrates a scanning electron microscope (SEM) image of a waveguide cross-section of the waveguide of FIG. 4B.

Figure 4D:
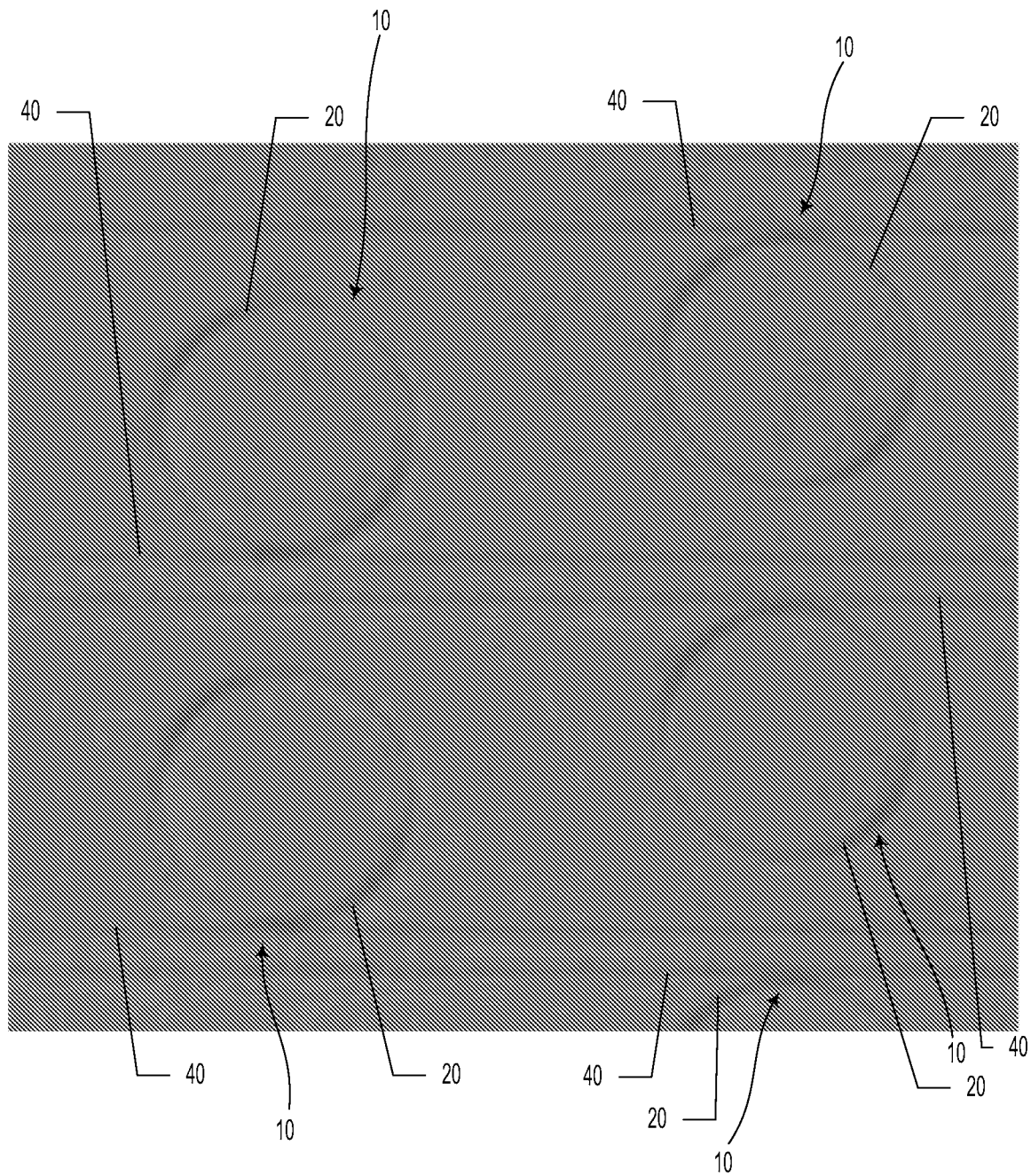
FIG. 4D illustrates an optical microscope image of an array of fabricated microring resonators with associated coupling waveguides after ISM functionalization, according to an example embodiment.

FIG. 4D illustrates an optical microscope image of several fabricated microring resonators 20 and associated coupling waveguides 40, according to an example embodiment fabricated using the method described above.

Because of the low refractive index of SU-8, the waveguide 40 is designed to have a relatively large width of 1 μm to obtain good optical confinement. The square-shaped cross-section supports one fundamental transverse electric (TE) and one transverse magnetic (TM) mode. The waveguide 40 is extended to the edge of the chip, where it is cleaved to obtain a smooth facet for end-fire coupling using optical fibers 510, 520 as illustrated in FIG. 5.

Figure 5:
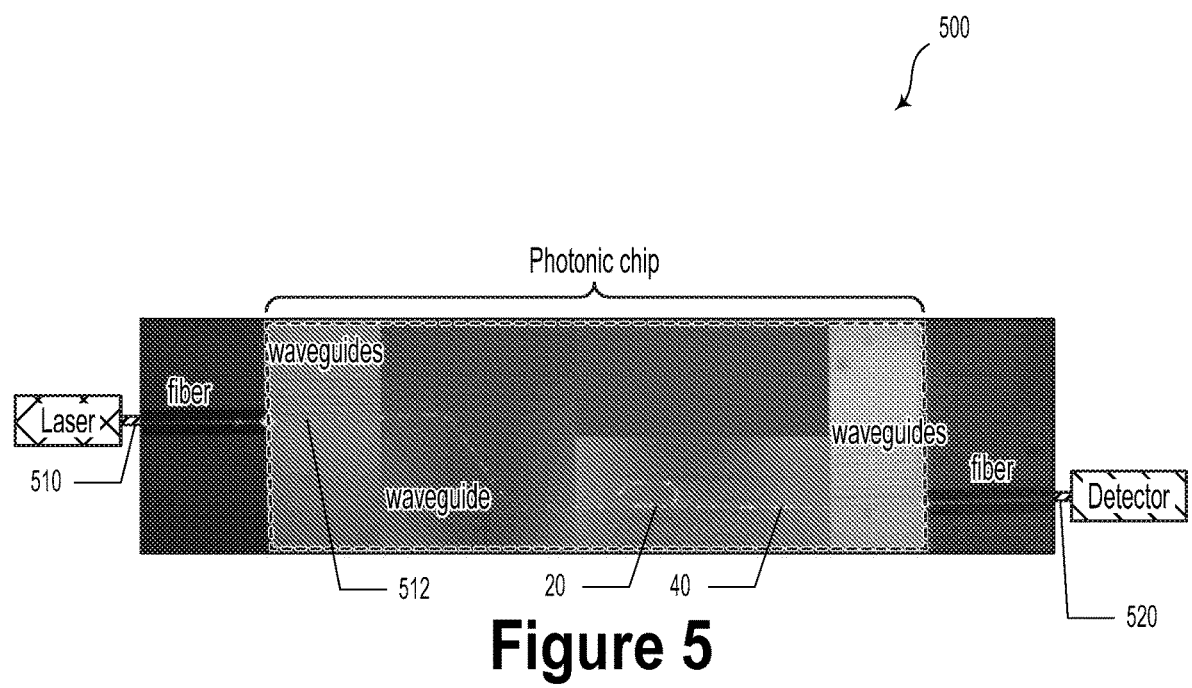
FIG. 5 illustrates an optical microscope image of a photonic sensor chip with coupling fibers glued to the coupling waveguides, according to an example embodiment.

FIG. 5 illustrates an optical image of a sensor 500 with coupling fibers 510 and 520, according to an example embodiment.

The waveguide 40 includes a tapered portion 512 that includes a larger width (2 μm) at the chip edge to improve the coupling efficiency with the input single mode fiber 510 which has a mean field diameter of 4 μm. A multimode fiber 520 with a core diameter of 50 μm diameter is used for the output for higher collection efficiency. The device 500 is packaged by carefully aligning and gluing the coupling optical fibers 510 and 520 to the silicon chip using UV curable glues to ensure long-term stable optical transmission, which also allows the device 500 to be moved from an alignment setup to a testing setup for actual sensing applications.

During the UV curing process, the ISM coating (e.g., ISM 30) is protected from UV light to avoid material degradation and loss of functionality.

Figure 6A:
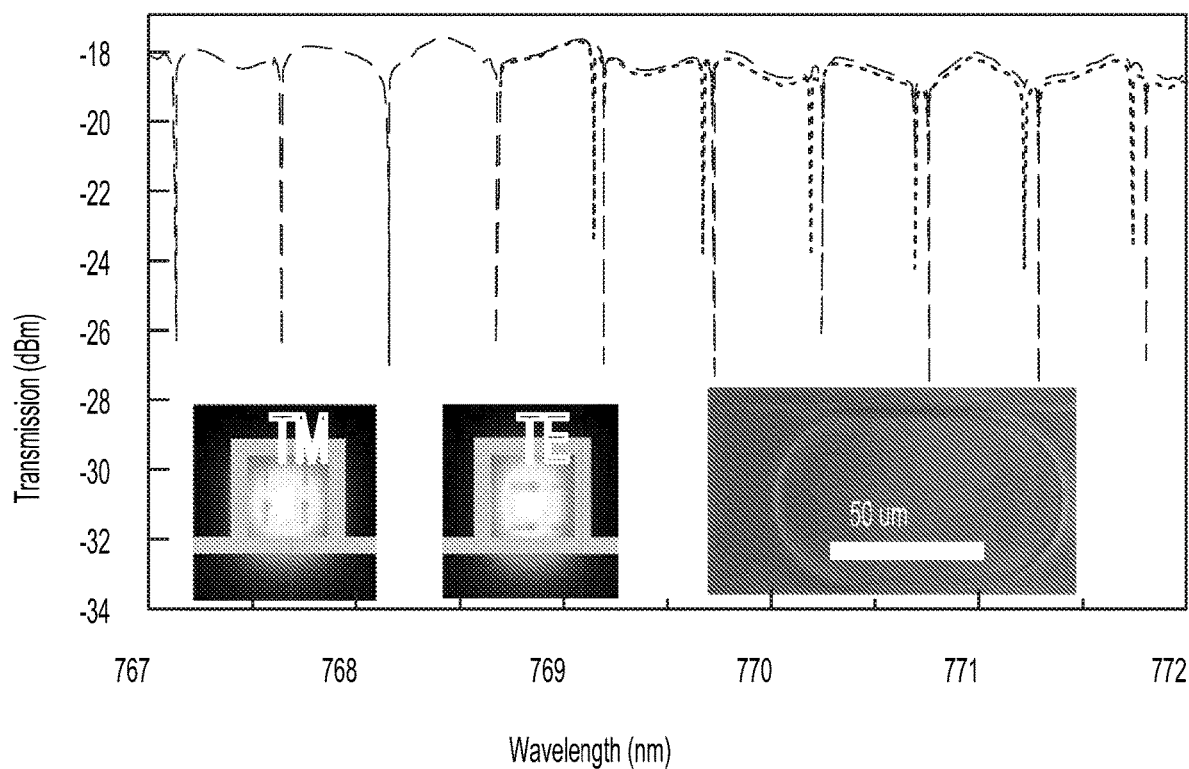
FIG. 6A illustrates an optical transmission spectrum of the microresonator shown in the inset without functionalization coating, according to an example embodiment.

FIG. 6A illustrates an optical transmission spectrum of a microresonator (see inset) without functionalization coating, according to an example embodiment. Inset of FIG. 6A shows the electric field distribution of the transverse-electric (TE) and transverse-magnetic (TM) modes, as well as the racetrack-shaped microresonator.

Figure 6B:
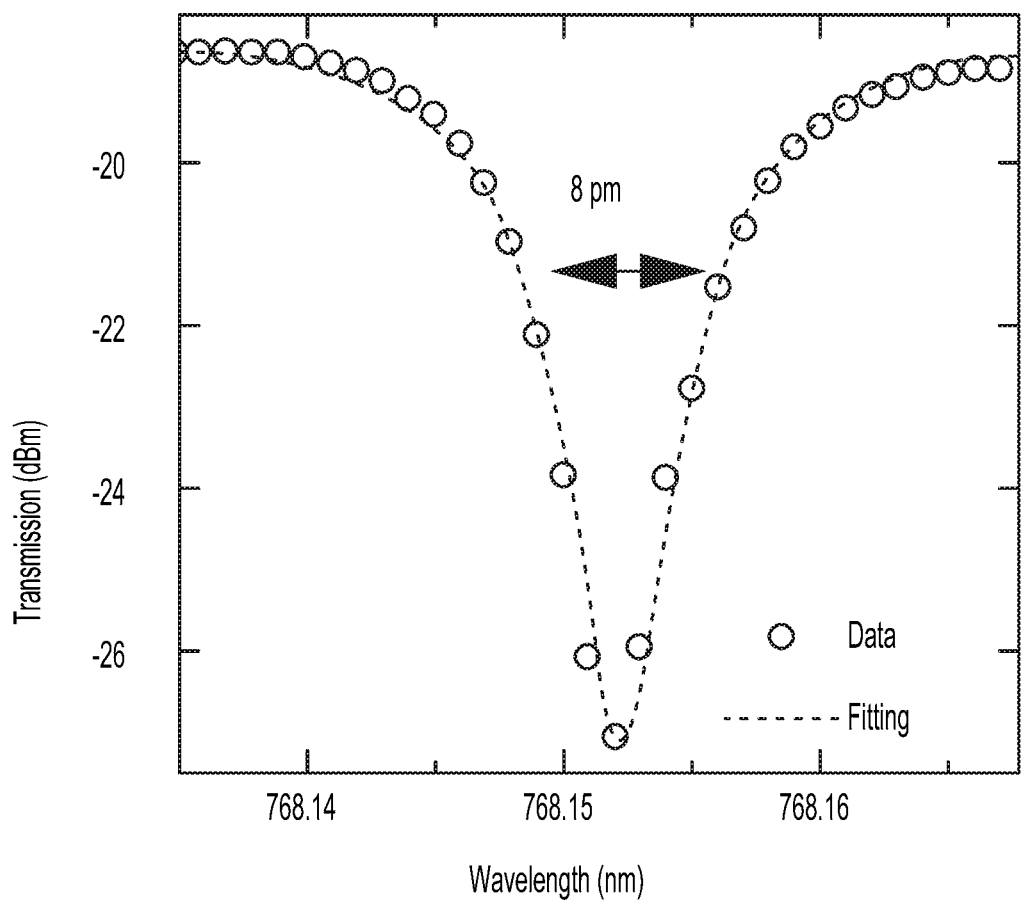
FIG. 6B illustrates a zoomed-in spectrum of one optical resonance, showing a linewidth of 8 pm, according to an example embodiment.

FIG. 6B illustrates a zoomed-in spectrum of one optical resonance, showing a linewidth of 8 μm, according to an example embodiment.

Figure 6C:
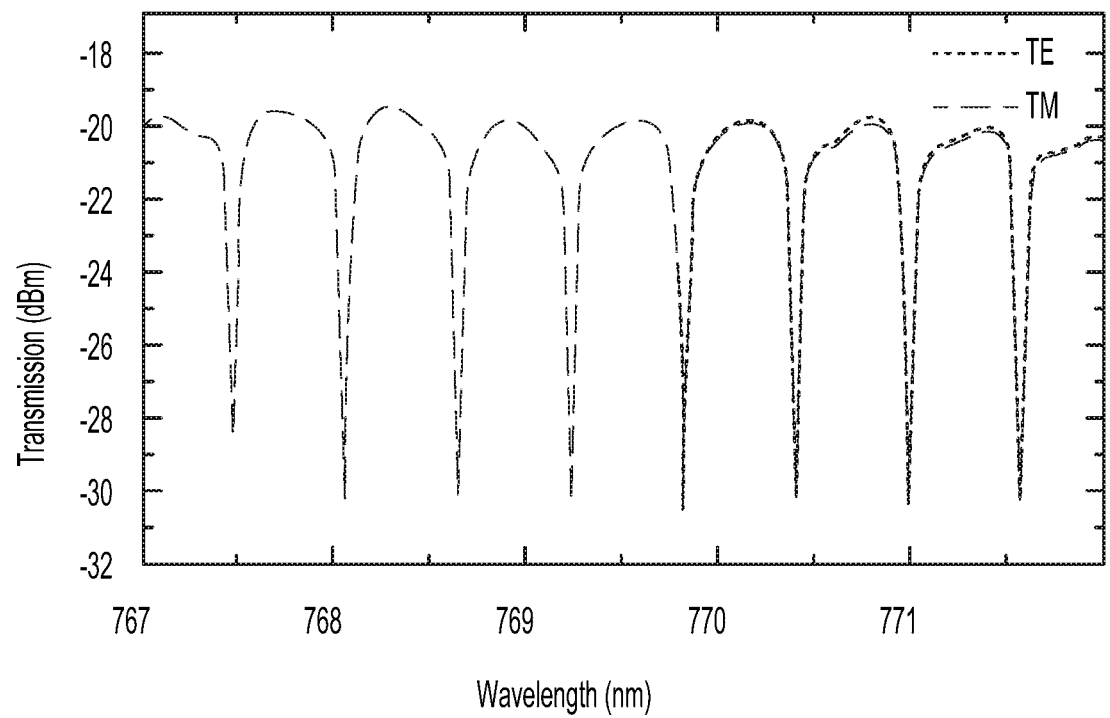
FIG. 6C illustrates an optical transmission spectrum of a microresonator with an ion-selective membrane coating, according to an example embodiment.

FIG. 6C illustrates an optical transmission spectrum of a microresonator with an ion-selective membrane coating, according to an example embodiment.

Figure 6D:
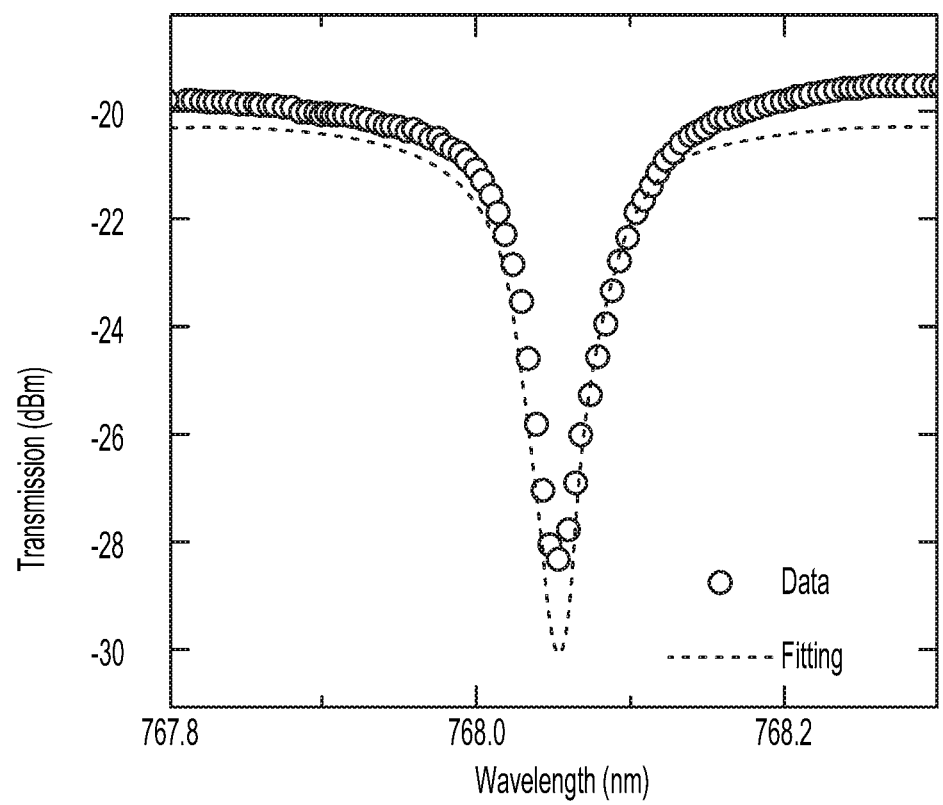
FIG. 6D illustrates a zoomed-in spectrum of one optical resonance for a functionalized device, according to an example embodiment.

FIG. 6D illustrates a zoomed-in spectrum of one optical resonance for a functionalized device, according to an example embodiment.

Figure 6E:
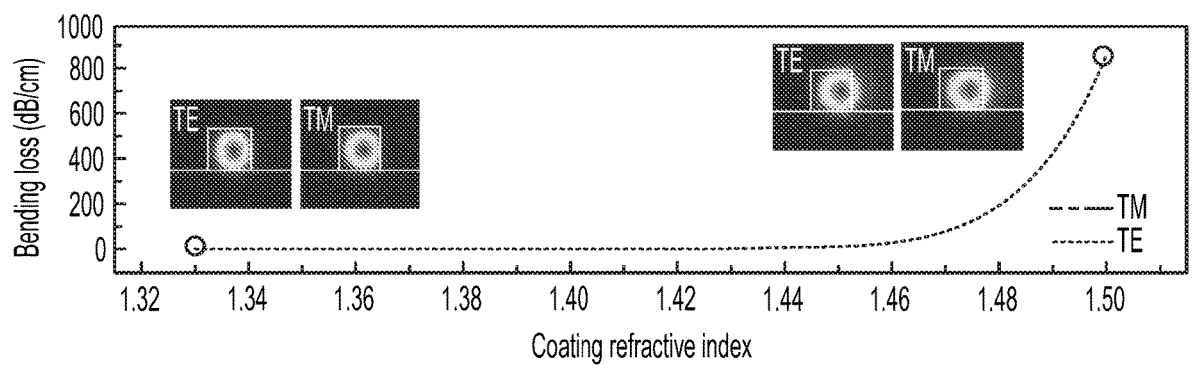
FIG. 6E illustrates bending loss of a 1×1 $\mu m^2$ SU-8 waveguide (with a bending radius of 30 μm) as a function of refractive index of the functionalization coating at 770 nm wavelength, according to an example embodiment.

FIG. 6E illustrates bending loss of a 1×1 μm² SU-8 waveguide (with a bending radius of 30 μm) as a function of refractive index of the functionalization coating at 770 nm wavelength, according to an example embodiment. Inset of Figure of 6E shows the electric field distribution of the TE and TM modes at n=1:33 and n=1:50.

A typical measured transmission spectrum of a microresonator is shown in FIG. 6A. A series of optical resonance dips are visible in the transmission spectrum at wavelengths that satisfy the resonance condition $\Delta = n_{eff} \times L/m$, where λ is the resonance wavelength, $n_{eff}$ is the effective index of the waveguide mode, L is the total length of the cavity, and m is an integer mode index. An external cavity (Newport TLB 6712) was utilized that can be precisely tuned in the range 765 to 781 nm because of the low water absorption in this frequency range and relatively large tuning range. The micro-resonator has a racetrack shape, with a bending radius of 30 μm and a straight portion of 240 μm. The total length is 675 μm, yielding a free spectral range (FSR) of 0.526 nm. The coupling gap between the micro-resonator to the waveguide is optimized to obtain a large extinction ratio. In the illustrated embodiment, the coupling gap is 300 nm but it is contemplated that the coupling gap could be other than 300 nm. Because of the square shape of the waveguide cross-section, the two modes, TE and TM, are almost degenerate and their FSR is very similar. The calculated sensitivity of such microresonators is 500 nm/refractive index unit (RIU). Without the ISM coating, the microresonator shows an extremely high quality factor (96.000 for the loaded Q factor) which gives a narrow linewidth of 8 μm. The high spectral resolution of the tunable laser provides resolution of sub-pm shifts of the optical resonance.

However, in some cases, after applying the ISM coating, the resonance lines disappear in the spectrum. There are a few factors that may cause the disappearance of the resonances. The first one is the loss induced by the ISM. However, literature, UV-VIS measurement, and visual observation indicate that the ISM should be transparent in the selected wavelength range. The second possible cause is the changed coupling condition as a result of the change in the surrounding environment. However, on the same chip, a series of devices with a broad range of coupling gaps have been fabricated, but none of them show any sign of optical resonance. The third possibility is due to bending loss. Because the ISM has a refractive index of around 1.52 which is very similar to that of the SU-8 epoxy, the optical mode confinement in the SU-8 waveguides are much worse, making the optical modes more prone to leak at the waveguide bends. Optical simulations using Lumerical FDTD indicate that the optical bending loss increases from 3 dB/cm to 800 dB/cm when the coating refractive index increases from 1.33 to 1.50 for a bending radius of 30 µm and, as a result, no resonance could be maintained. From the electric field distribution of the bent waveguide, simulations indicate that the mode leaks to the coating when the coating refractive index is very close to the refractive index of the SU-8 waveguide core, as illustrated in FIG. 6E.

By using a larger microring resonator 20 with a radius of 100 µm, the bending loss induced by the ISM is reduced. To ensure good coupling between the microring resonator 20 and the waveguide 40, a pulley-type coupling waveguide is used which wraps around the microring resonator for a length of about 50 µm.

The radius of the microring is 100 µm, giving a total perimeter of 628 µm. By adjusting the coupling gap, a high extinction ratio is obtained. In an example embodiment, the TE and TM modes are degenerate, with an identical FSR of 0.577 nm. Because of the material loss in the ISM, the final resonance Q factor dropped to 10,000 with a corresponding linewidth of around 80 µm. Despite of the degraded linewidth, high sensitivity is still achievable in part, due to the high spectral resolution of the tunable laser.

Figure 7A:
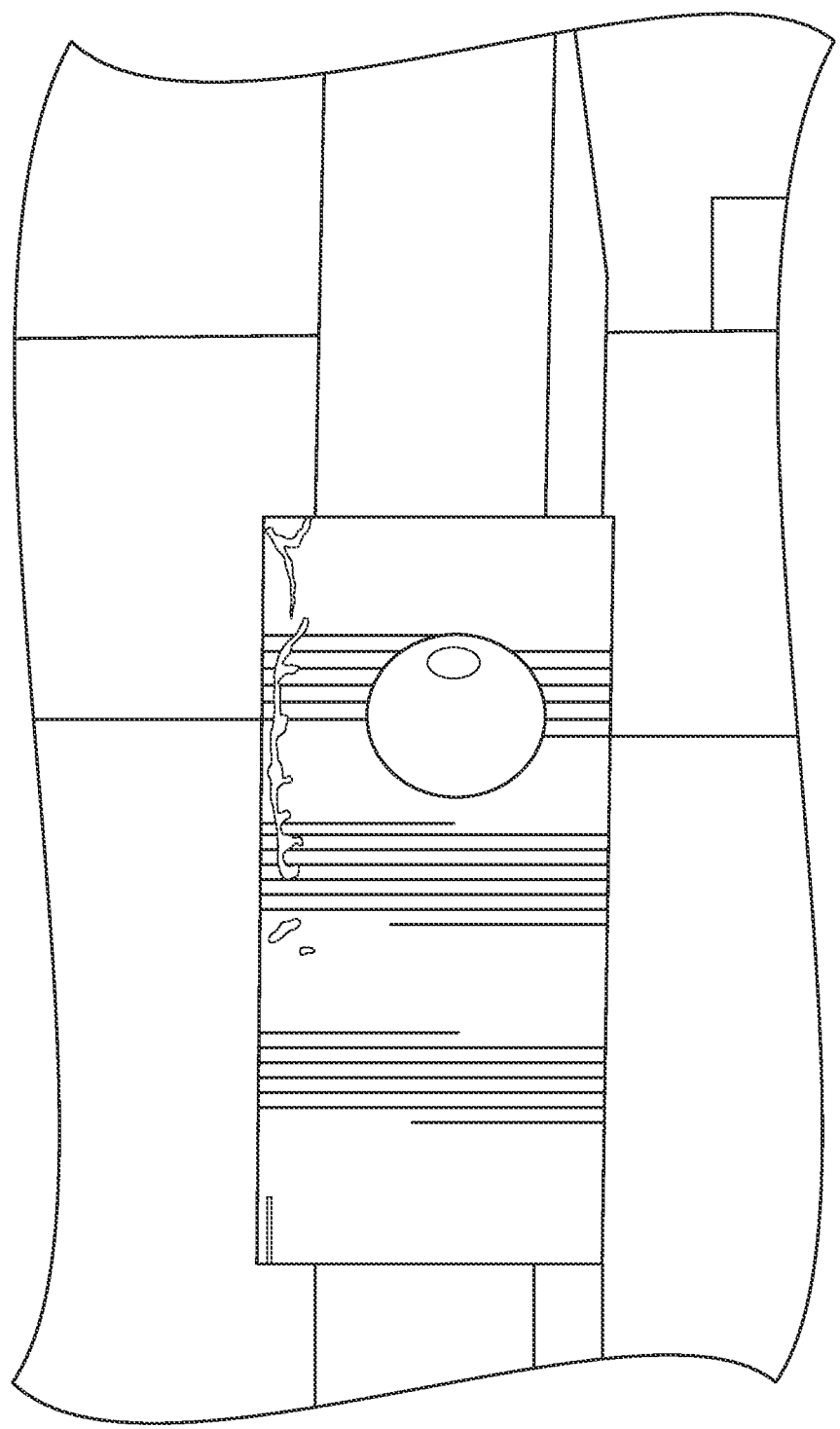
FIG. 7A illustrates a photonic sensor chip having a single droplet of sodium nitrate solution on the surface for the concentration measurement, according to an example embodiment.

FIG. 7A shows a single droplet of sodium nitrate solution placed on the surface of the sample chip for the concentration measurement, according to an example embodiment.

Figure 7B:
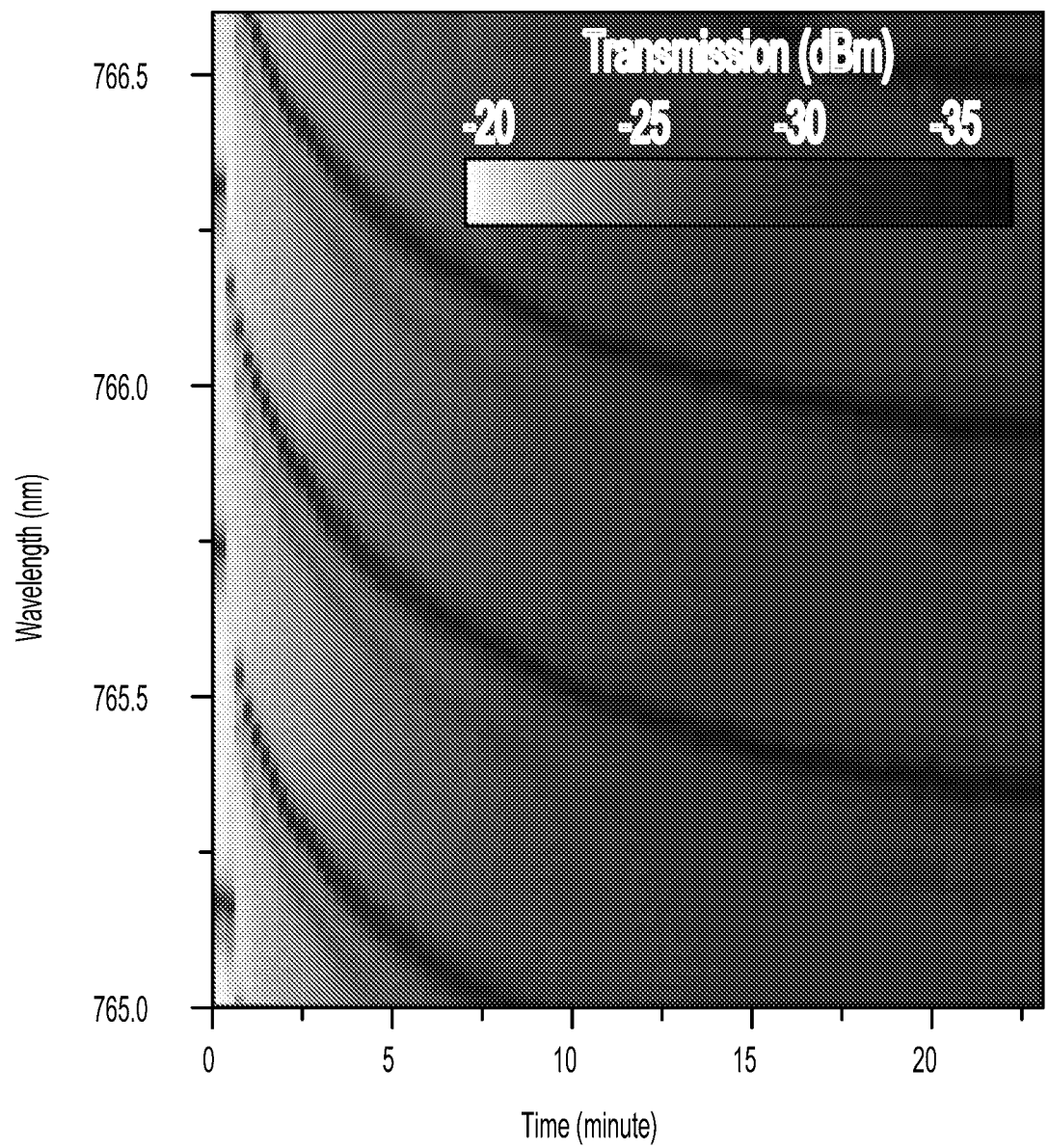
FIG. 7B illustrates an intensity map of the transmission spectrum over time for the photonic sensor chip of FIG. 7A. The color represents the transmission amplitude (in dBm), according to an example embodiment.

FIG. 7B illustrates an intensity map of the transmission spectrum over time. The color represents the transmission amplitude (in dBm), according to an example embodiment. Dark lines are the resonance dips, whose wavelength shifts upon adding the nitrate solution droplet to the chip surface.

To determine the change of refractive index caused by the nitrate solution, a droplet of sodium nitrate solution is added to the surface of the sample chip, as illustrated in FIG. 7A. Prior to the test, the ISM coated device is conditioned overnight in the sodium solution with 2 ppm nitrogen concentration. The exchange of nitrate ions between the functionalization coating with the solution causes the change of refractive index in the coating. Such refractive index change around the microring in turn shifts the optical resonance wavelength. Because the ion exchange is a relatively slow process, a constant drift of the resonance is observed. Within the short period of observation time, the exchange rate of nitrate ion is a constant determined by the concentration contrast between the solution and the coating. As a result, the refractive index change and accordingly the optical resonance shift rate is fixed and reflects the concentration contrast. However, when the device turns from dry to wet, the ISM experiences a swelling process which leads to a fast exponential shift of the resonance wavelength, as illustrated in FIG. 7B, making it difficult to extract the resonance shift caused directly by the ion exchange process.

The response of the functionalized micro-ring resonator device to the presence of nitrate ions is further tested by immersing the device in sodium nitrate solutions of various concentrations. Prior to the measurement, the device was conditioned overnight in a sodium nitrate solution with 2 ppm nitrogen concentration in order to remove interfering ions. The solution concentration is indicated herein using nitrogen instead of nitrate because in many applications in soil science or biology research it is the absolute nitrogen quantity that plays the key role. Following the conditioning, the devices are tested (for sensitivity and selectivity) by immersing them in nitrate solutions of different concentrations while carrying out the optical measurements in situ. This is made possible by the packaging of sample chip with optical fibers, which also makes the device more suitable for field applications compared with microfluidic devices. The glued coupling fibers guarantee reliable transmission during this process. The refractive index of the ISM coating changes when the ISM exchanges ions with nitrate solutions with different concentrations, which, in turn, shifts the optical resonance wavelength of the micro-resonator.

As the ion exchange is a relatively slow process, the resonance wavelength shifts during the ion exchange process, and the shift rate is determined by the nitrate concentration in the solution. As a result, the nitrate concentration can be derived by monitoring the resonance shift. Such a test method has multiple advantages compared with the droplet test scheme. First, it keeps the device wet all the time, eliminating the change of refractive index due to the swelling observed at the beginning of each droplet test. Second, it allows continuous variation of the solution concentration for a more systematic study. Third, it avoids sample concentration change in the small droplet due to evaporation. In some implementations, the resonance shift (instead of the resonance shift rate) could be used to derive the ion concentration by using the value of the resonance shift after the ion exchange process has reached a steady state. The optical resonances are thus directly correlated with the nitrogen concentration in this case.

Figure 8A:
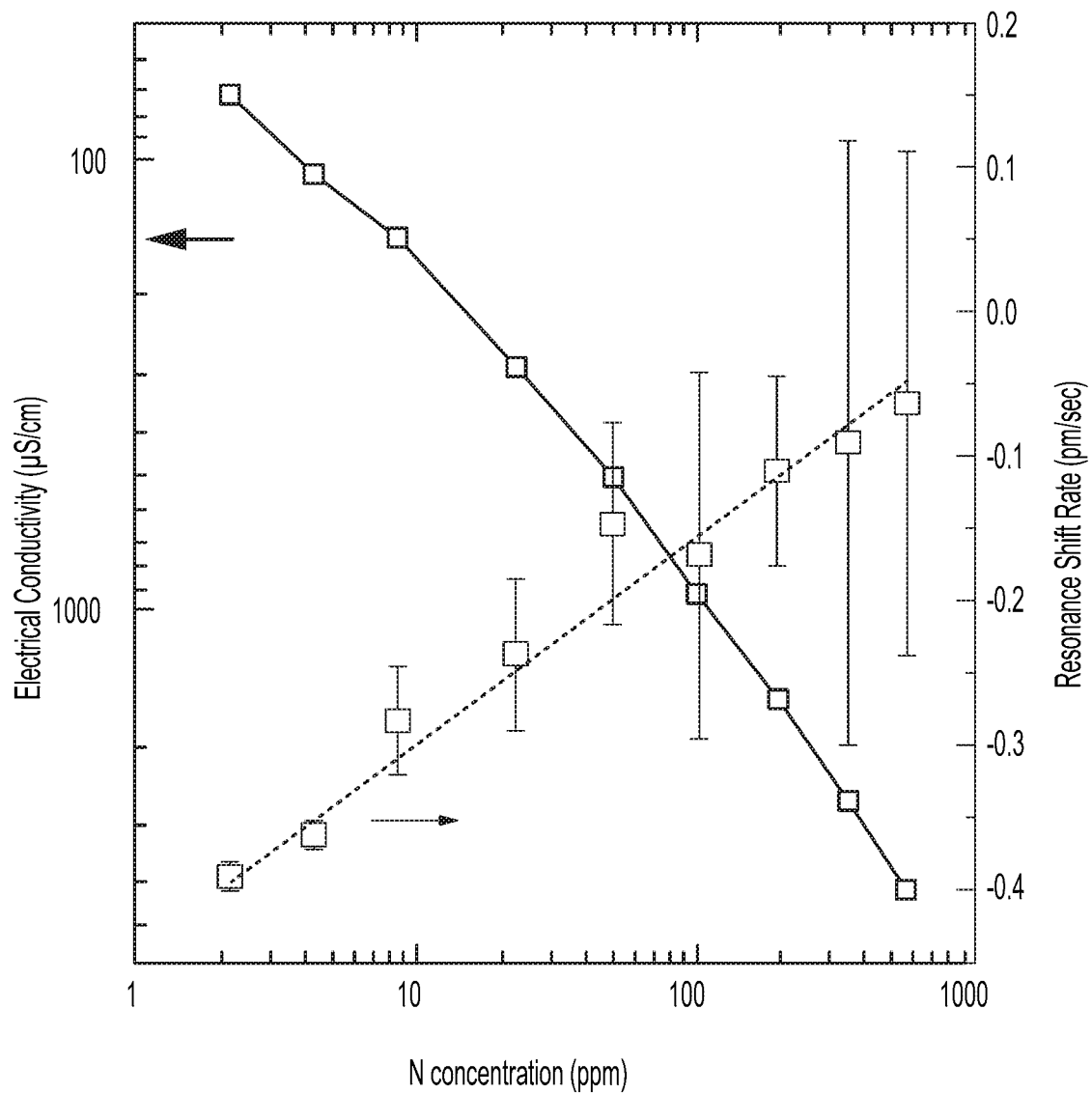
FIG. 8A illustrates a measured resonance shift rate and electric conductivity as a function of nitrogen concentration for the photonic sensor chip of FIG. 7A immersed in a solution of sodium nitrate, according to an example embodiment.

FIG. 8A illustrates a measured resonance shift rate and electric conductivity as a function of nitrogen concentration, according to an example embodiment.

Figure 8B:
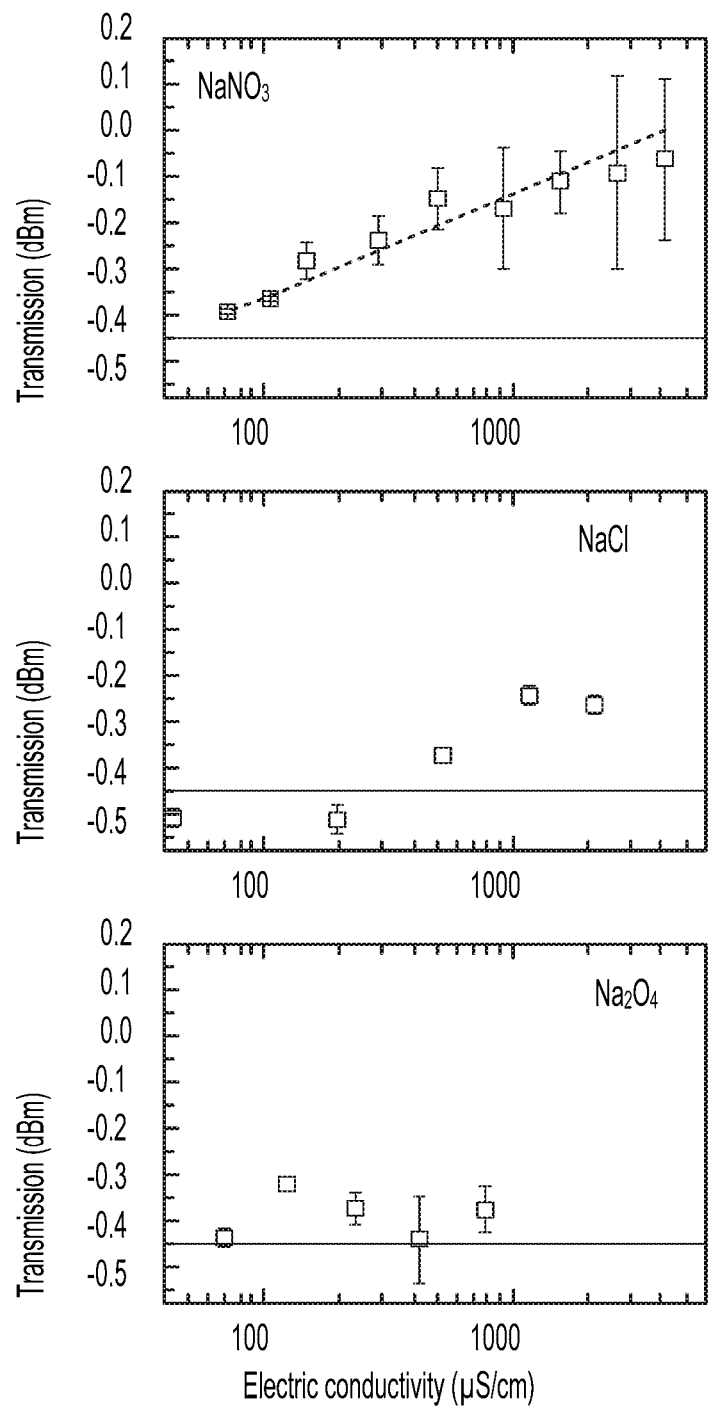
FIG. 8B illustrates a resonance shift rate as a function of electric conductivity for the photonic sensor chip of FIG. 7A immersed in three different solutions, according to an example embodiment.

FIG. 8B illustrates a resonance shift rate as a function of electric conductivity in three different solutions, according to an example embodiment.

By increasing the sodium nitrate concentration in the solution, the nitrogen concentration can be varied from 2 ppm to 600 ppm and monitor the resonance wavelength shift.

Additionally, the electric conductivity of the solution is recorded as a reference. FIG. 8A plots the resonance shift rate of one optical mode, together with the electric conductivity, as a function of nitrogen concentration. Both parameters are linearly correlated with the logarithm of the nitrogen concentration. Numerical fitting gives a relationship of $S=-0.4431+0.06247 \times \ln N$, where S is the resonance shift rate in the unit of pm/s, while N is the nitrogen concentration in the unit of ppm. The benefit of observing the resonance shift rate instead of an absolute resonance shift is that such measurement takes a time average and therefore is robust against certain types of interference. The detection limit is determined, in part, by the laser stability. Based on its specification, the tunable laser has a spectrum stability of $S=2$ µm/hour, which is the resolution of our detection. On the other hand, the sensitivity extrapolated from FIGS. 8A and 8B provides a sensitivity of 0.0625 [pm/s]/ppb. Therefore, the limit of detection can be calculated as LD=R/S=9 ppt. In other embodiments, the detection limit may be 7 ppt or better.

III. Example Methods

Figure 9:
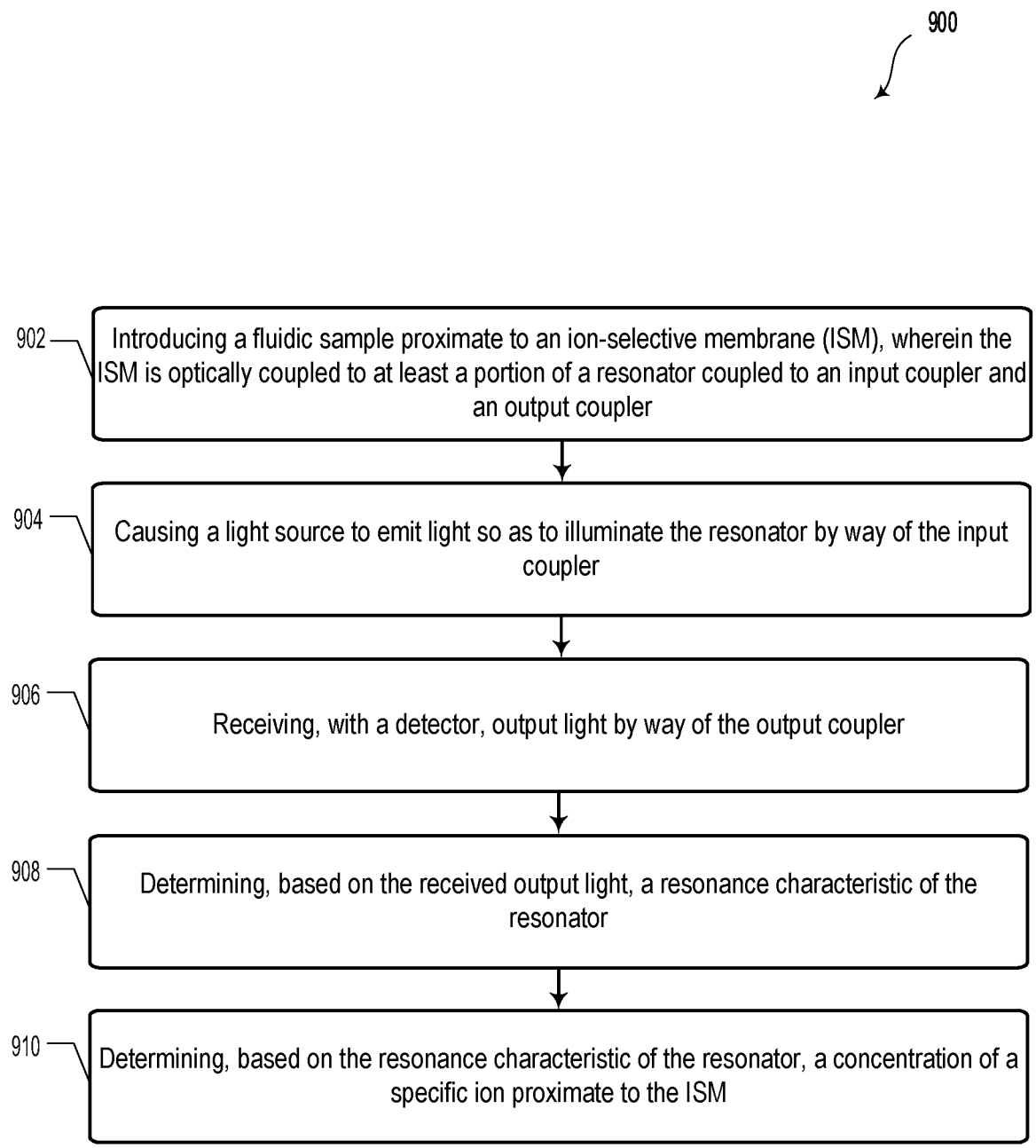
FIG. 9 illustrates a method for sensing an ion concentration of a solution, according to an example embodiment.

FIG. 9 illustrates a method 900, according to an example embodiment. It will be understood that the method 900 may include fewer or more steps or blocks than those expressly illustrated or otherwise disclosed herein. Furthermore, respective steps or blocks of method 900 may be performed in any order and each step or block may be performed one or more times. In some embodiments, some or all of the blocks or steps of method 900 may be carried out by a controller described herein. Yet further, method 900 may be carried out, at least in part, by the systems illustrated and described herein.

Block 902 includes introducing a fluidic sample proximate to an ion-selective membrane (ISM). The ISM is optically coupled to at least a portion of a resonator coupled to an input coupler and an output coupler.

Block 904 includes causing a light source to emit light so as to illuminate the resonator by way of the input coupler.

Block 906 includes receiving, with a detector, output light by way of the output coupler.

Block 908 includes determining, based on the received output light, a resonance characteristic of the resonator.

Block 910 includes determining, based on the resonance characteristic of the resonator, a concentration of a specific ion proximate to the ISM.

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

A step or block that represents a processing of information can correspond to circuitry that can be configured to perform the specific logical functions of a herein-described method or technique. Alternatively or additionally, a step or block that represents a processing of information can correspond to a module, a segment, a physical computer (e.g., a field programmable gate array (FPGA) or application-specific integrated circuit (ASIC)), or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

While various examples and embodiments have been disclosed, other examples and embodiments will be apparent to those skilled in the art. The various disclosed examples and embodiments are for purposes of illustration and are not intended to be limiting, with the true scope being indicated by the following claims.

IV. Enumerated Example Embodiments

Embodiments of the present disclosure may thus relate to one of the enumerated example embodiments (EEEs) listed below.

EEE 1 is a system comprising:
a resonator, an input coupler and an output coupler;
an ion-selective membrane (ISM) optically coupled to at least a portion of the resonator;
a light source configured to illuminate the resonator by way of the input coupler; and a detector configured to receive output light by way of the output coupler and provide information indicative a concentration of a specific ion proximate to the ISM.

EEE 2 is the system of EEE 1, further comprising a substrate, wherein the resonator is disposed on the substrate, wherein the substrate comprises a silicon base layer and a silicon dioxide overlayer.

EEE 3 is the system of EEEs 1 or 2, wherein the resonator comprises at least one of:
an epoxy-based negative photoresist, wherein the epoxy-based negative photoresist comprises SU-8 photoresist; silicon; or silicon nitride.

EEE 4 is the system of any of EEEs 1-3, wherein the resonator comprises at least one of: a ring resonator, a racetrack resonator, a disk resonator, a photonic crystal cavity, or a Bragg grating cavity.

EEE 5 is the system of any of EEEs 1-4, wherein the resonator is configured to support degenerate fundamental transverse electric (TE) and transverse magnetic (TM) modes.

EEE 6 is the system of any of EEEs 1-5, wherein the ISM is dispersed in polyvinyl chloride (PVC).

EEE 6a is the system of any of EEEs 1-6, wherein the ISM comprises at least one of: tridodecylmethylammonium nitrate ($TDDMA-NO_3^-$), trioctylmethylammonium nitrate ($TOMA-NO_3^-$), tritetradecylmethylammonium nitrate ($TTDMA-NO_3^-$), trihexadecylmethylammonium nitrate ($THDMA-NO_3^-$), or trioctadecylmethylammonium nitrate ($TODMA-NO_3^-$).

EEE 7 is the system of any of EEEs 1-6a, wherein the ISM is disposed as an overlayer on at least a portion of the resonator.

EEE 8 is the system of any of EEEs 1-7, wherein the ISM comprises at least one ionophore, wherein the at least one ionophore is configured to transport a specific ion through the ISM.

EEE 9 is the system of any of EEEs 1-8, wherein a resonance condition of the resonator is based on a refractive index of the ISM.

EEE 10 is the system of EEE 9, wherein the refractive index of the ISM is based on a local concentration of the specific ion.

EEE 11 is the system of any of EEEs 1-10, wherein the specific ion comprises at least one of: a nitrite ion or a fluoride ion.

EEE 12 is the system of any of EEEs 1-11, wherein the light source comprises at least one of: a tunable cavity laser, a tunable diode laser, a distributed feedback (DFB) laser, or a quantum cascade laser.

EEE 13 is the system of any of EEE 1-12, wherein the detector comprises at least one of: a photodiode, a photoconductor, a charge-coupled device (CCD), or an active-pixel sensor (APS).

EEE 14 is the system of any of EEE 1-13, further comprising a controller having at least one processor and a memory, wherein the at least one processor executes instructions stored in the memory so as to carry out operations, the operations comprising:
  causing the light source to emit light so as to illuminate the resonator by way of the input coupler;
  receiving, with the detector, output light by way of the output coupler;
  determining, based on the received output light, a refractive index of the resonator: and
  determining, based on the refractive index of the resonator, a concentration of the specific ion proximate to the ISM.

EEE 15 is the system of EEE 14, wherein the operations further comprise adjusting an emission wavelength of the light source, wherein determining the concentration of the specific ion proximate to the ISM is further based on the emission wavelength of the light source.

EEE 16 is an analyte sensor array comprising:
  a substrate;
  a plurality of resonators, a plurality of input couplers, and a plurality of output couplers disposed on the substrate, wherein each resonator is coupled to a respective input coupler and a respective output coupler;
  a plurality of ion-selective membranes (ISMs), each ISM being optically coupled to a respective resonator of the plurality of resonators;
  at least one light source configured to illuminate the plurality of resonators by way of the respective input couplers; and
  a detector configured to receive output light by way of the respective output couplers and provide information indicative of a concentration of one or more specific ions proximate to the respective ISMs.

EEE 17 is the analyte sensor array of EEE 16, wherein a first ISM of the plurality of ISMs comprises a first ionophore, wherein a second ISM of the plurality of ISMs comprises a second ionophore, wherein the first ionophore is configured to transport a first specific ion through the first ISM, and wherein the second ionophore is configured to transport a second specific ion through the second ISM.

EEE 18 is the analyte sensor array of EEE 16 or EEE 17, further comprising a controller having at least one processor and a memory, wherein the at least one processor executes instructions stored in the memory so as to carry out operations, the operations comprising:
  causing the at least one light source to emit light so as to illuminate the plurality of resonators by way of the respective input couplers;
  receiving, with the plurality of detectors, output light by way of the respective output couplers;
  determining, based on the received output light, a respective resonance characteristic of the respective resonators; and
  determining, based on the respective resonance characteristic of the respective resonator, a respective concentration of the specific ion proximate to the respective ISMs.

EEE 19 is a method comprising:
  introducing a fluidic sample proximate to an ion-selective membrane (ISM), wherein the ISM is optically coupled to at least a portion of a resonator coupled to an input coupler and an output coupler;
  causing a light source to emit light so as to illuminate the resonator by way of the input coupler;
  receiving, with a detector, output light by way of the output coupler;
  determining, based on the received output light, a resonance characteristic of the resonator; and
  determining, based on the resonance characteristic of the resonator, a concentration of a specific ion proximate to the ISM.

EEE 20 is the method of EEE 19, further comprising adjusting an emission wavelength of the light source, wherein determining the concentration of the specific ion proximate to the ISM is further based on the emission wavelength of the light source.

EEE 21 is a sensor for sensing ion concentration comprising:
  a resonator;
  an input coupler coupled to the resonator to couple and configured to receive input light from a light source;
  an output coupler coupled to the resonator and configured to transmit output light from the resonator to a detector;
  an ion-selective membrane (ISM) optically coupled to at least a portion of the resonator, a refractive index of the ISM being indicative of the ion concentration of a specific ion proximate to the ISM, a resonance condition of the resonator being based on the refractive index of the ISM, the output light being thereby indicative of the ion concentration of the specific ion proximate to the ISM.

EEE 22 is the sensor of EEE 21, further comprising a substrate, wherein the resonator is disposed on the substrate, wherein the substrate comprises a silicon base layer and a silicon dioxide overlayer.

EEE 23 is the sensor of EEE 21 or EEE 22, wherein the resonator comprises a high dielectric constant material.

EEE 24 is the sensor of any of EEEs 21-23, wherein the resonator comprises at least one of:
  an epoxy-based negative photoresist, wherein the epoxy-based negative photoresist comprises SU-8 photoresist;
  silicon; and
  silicon nitride.

EEE 25 is the sensor of any of EEEs 21-24, wherein the resonator comprises at least one of: a ring resonator, a racetrack resonator, a disk resonator, a photonic crystal cavity, and a Bragg grating cavity.

EEE 26 is the sensor of any of EEEs 21-25, wherein the resonator is configured to support degenerate fundamental transverse electric (TE) and transverse magnetic (TM) modes.

EEE 27 is the sensor of any of EEEs 21-26, comprising a waveguide coupled to the resonator, wherein the waveguide comprises the input coupler and output coupler.

EEE 28 is the sensor of any of EEEs 21-27, wherein the ISM is dispersed in polyvinyl chloride (PVC).

EEE 28a is the sensor of any of EEEs 21-28, wherein the ISM comprises at least one of: tridodecylmethylammonium nitrate (TDDMA-NO3-), trioctylmethylammonium nitrate (TOMA-NO3-), tritetradecylmethylammonium nitrate (TTDMA-NO3-), trihexadecylmethylammonium nitrate (THDMA-NO3-), and trioctadecylmethylammonium nitrate (TODMA-NO3-).

EEE 29 is the sensor of any of EEEs 21-28a, wherein the ISM is disposed as an overlayer on at least a portion of the resonator.

EEE 30 is the sensor of any of EEEs 21-29, wherein the ISM comprises at least one ionophore, wherein the at least one ionophore is configured to transport a specific ion through the ISM.

EEE 31 is the sensor of any of EEEs 21-30, wherein the refractive index of the ISM is based on a local concentration of the specific ion.

EEE 32 is the sensor of any of EEEs 21-31, wherein the specific ion comprises at least one of: a nitrite ion and a fluoride ion.

EEE 33 is system for sensing ion concentration comprising:
- a sensor according to any of EEEs 21-32;
- a light source coupled to the input coupler and configured to emit the input light; and
- a detector coupled to the output coupler and configured to receive the output light indicative of the concentration of the specific ion proximate to the ISM.

EEE 34 is the system of EEE 33, wherein the light source comprises at least one of: a tunable cavity laser, a tunable diode laser, a distributed feedback (DFB) laser, and a quantum cascade laser.

EEE 35 is the system of EEE 33 or EEE 34, wherein the detector comprises at least one of: a photodiode, a photoconductor, a charge-coupled device (CCD), and an active-pixel sensor (APS).

EEE 36 is the system of any of EEEs 33-35, further comprising a controller having at least one processor and a memory, wherein the at least one processor executes instructions stored in the memory so as to carry out operations, the operations comprising:
- causing the light source to emit light so as to illuminate the resonator by way of the input coupler;
- receiving, with the detector, output light by way of the output coupler;
- determining, based on the received output light, a resonance characteristic of the resonator; and
- determining, based on the resonance characteristic of the resonator, the ion concentration of the specific ion proximate to the ISM.

EEE 37 is the system of EEE 36, wherein the resonance characteristic is a resonance shift.

EEE 38 is the system of EEE 36 or EEE 37, wherein the resonance characteristic is a resonance shift rate.

EEE 39 is the system of any of EEEs 36-38, wherein the operations further comprise adjusting an emission wavelength of the light source, wherein determining the concentration of the specific ion proximate to the ISM is further based on the emission wavelength of the light source.

What is claimed is:

1. A sensor for sensing ion concentration comprising:
    a resonator;
    an input coupler coupled to the resonator to couple and configured to receive input light from a light source;
    an output coupler coupled to the resonator and configured to transmit output light from the resonator to a detector;
    an ion-selective membrane (ISM) optically coupled to and integrally covering the resonator, a refractive index of the ISM being indicative of the ion concentration of a specific ion proximate to the ISM, a resonance condition of the resonator being based on the refractive index of the ISM, the output light being thereby indicative of the ion concentration of the specific ion proximate to the ISM; and
    a substrate, wherein the resonator is unitedly placed on the substrate.

2. The sensor according to claim 1, wherein the substrate comprises a silicon base layer and a silicon dioxide overlayer.

3. The sensor according claim 1, wherein the resonator comprises a high dielectric constant material.

4. The sensor according to claim 1, wherein the resonator comprises at least one of:
    an epoxy-based negative photoresist, wherein the epoxy-based negative photoresist comprises SU-8 photoresist;
    silicon; and
    silicon nitride.

5. The sensor according to claim 1, wherein the resonator comprises at least one of: a ring resonator, a racetrack resonator, a disk resonator, a photonic crystal cavity, and a Bragg grating cavity.

6. The sensor according to claim 1, wherein the resonator is configured to support degenerate fundamental transverse electric (TE) and transverse magnetic (TM) modes.

7. The sensor according to claim 1, comprising a waveguide coupled to the resonator, wherein the waveguide comprises the input coupler and output coupler.

8. The sensor according to claim 1, wherein the ISM is dispersed in polyvinyl chloride (PVC).

9. The sensor according to claim 1, wherein the ISM comprises at least one of: tridodecylmethylammonium nitrate (TDDMA-$NO_3^-$), trioctylmethylammonium nitrate (TOMA-$NO_3^-$), tritetradecylmethylammonium nitrate (TTDMA-$NO_3^-$), trihexadecylmethylammonium nitrate (THDMA-$NO_3^-$), and trioctadecylmethylammonium nitrate (TODMA-$NO_3^-$).

10. The sensor according to claim 1, wherein the ISM is disposed as an overlayer on at least a portion of the resonator.

11. The sensor according to claim 1, wherein the ISM comprises at least one ionophore, wherein the at least one ionophore is configured to transport a specific ion through the ISM.

12. The sensor according to claim 1, wherein the refractive index of the ISM is based on a local concentration of the specific ion.

13. The sensor according to claim 1, wherein the specific ion comprises at least one of: a nitrite ion and a fluoride ion.

14. An analyte sensor array comprising:
    a substrate;
    a plurality of resonators, a plurality of input couplers, and a plurality of output couplers disposed on the substrate, wherein each resonator is unitedly placed on the substrate and coupled to a respective input coupler and a respective output coupler;
    a plurality of ion-selective membranes (ISMs), each ISM being optically coupled to and integrally covering a respective resonator of the plurality of resonators a refractive index of the ISM being indicative of the ion concentration of a specific ion proximate to the ISM;
    at least one light source configured to illuminate the plurality of resonators by way of the respective input couplers; and
    a detector configured to receive output light by way of the respective output couplers and provide information indicative of a concentration of one or more specific ions proximate to the respective ISMs.

15. The analyte sensor array of claim 14, wherein a first ISM of the plurality of ISMs comprises a first ionophore, wherein a second ISM of the plurality of ISMs comprises a second ionophore, wherein the first ionophore is configured to transport a first specific ion through the first ISM, and wherein the second ionophore is configured to transport a second specific ion through the second ISM.

16. The analyte sensor array according to claim 14, further comprising a controller having at least one processor and a memory, wherein the at least one processor executes instructions stored in the memory so as to carry out operations, the operations comprising:
- causing the at least one light source to emit light so as to illuminate the plurality of resonators by way of the respective input couplers;
- receiving, with the plurality of detectors, output light by way of the respective output couplers;
- determining, based on the received output light, a resonance characteristic of the respective resonators; and
- determining, based on the resonance characteristic of the respective resonator, a respective concentration of the specific ion proximate to the respective ISMs.

17. A method comprising:
- introducing a fluidic sample proximate to an ion-selective membrane (ISM), wherein the ISM is optically coupled to at least a portion of and integrally covers a resonator coupled to an input coupler and an output coupler, and wherein the resonator is unitedly placed on a substrate, a refractive index of the ISM being indicative of the ion concentration of a specific ion proximate to the ISM;
- causing a light source to emit light so as to illuminate the resonator by way of the input coupler;
- receiving, with a detector, output light by way of the output coupler;
- determining, based on the received output light, a resonance characteristic of the resonator; and
- determining, based on the resonance characteristic of the resonator, a concentration of a specific ion proximate to the ISM.

18. The method according to claim 17, further comprising adjusting an emission wavelength of the light source, wherein determining the concentration of the specific ion proximate to the ISM is further based on the emission wavelength of the light source.

19. The method according to claim 17, wherein the resonance characteristic is a resonance shift.

20. The method according to claim 17, wherein the resonance characteristic is a resonance shift rate.

* * * * *